United States Patent
Skinner

(10) Patent No.: US 6,750,310 B1
(45) Date of Patent: Jun. 15, 2004

(54) POLYISOCYANATE COMPOSITIONS FOR FAST CURE

(75) Inventor: Christopher J Skinner, Brussels (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/030,384

(22) PCT Filed: Jun. 29, 2000

(86) PCT No.: PCT/EP00/06057

§ 371 (c)(1), (2), (4) Date: Jan. 10, 2002

(87) PCT Pub. No.: WO01/07498

PCT Pub. Date: Feb. 1, 2001

(30) Foreign Application Priority Data

Jul. 26, 1999 (EP) .............................................. 99114601

(51) Int. Cl.[7] .............................................. C08G 18/22

(52) U.S. Cl. .................... 528/56; 428/425.1; 156/331.7; 524/13; 524/14

(58) Field of Search ........................ 528/56; 428/425.1; 156/331.7; 524/13, 14

(56) References Cited

U.S. PATENT DOCUMENTS 5,902,835 A    5/1999   Meier et al.

FOREIGN PATENT DOCUMENTS

| JP | 50138097 | 11/1975 |
| WO | 9717388 | 5/1997 |

*Primary Examiner*—Rachel Gorr
(74) *Attorney, Agent, or Firm*—Pillsbury Winthrop LLP

(57) ABSTRACT

Use of Titanium complex in a polyisocyanate composition comprising a titanium complex consisting of titanium and an acetoacetate ester in which the molar ratio of Ti to acetoacetate ester is in the range 1:2 and 1:8 and said acetoacetate ester is an ester of alcohol containing 1 to 4 carbon atoms for accelerating the binding of lignocellulosic materials.

24 Claims, No Drawings

POLYISOCYANATE COMPOSITIONS FOR FAST CURE

This application is the National Phase of International Application PCT/EP00/06057 filed Jun. 29, 2000, which designated the U.S. and that International Application was published under PCT Article 21(2) in English. The PCT application is hereby incorporated in its entirety by reference.

This invention relates to polyisocyanate compositions and, in particular, to polyisocyanate compositions containing certain organometallic compositions based on Group IVB metals and which utility in accelerating the binding of the lignocellulosic material used in the manufacture of waferboard (known extensively as oriented strand board), medium density fiberboard and particle board (also known as chipboard).

The use of organic polyisocyanates as binders for lignocellulosic material in the manufacture of sheets or moulded bodies such as waferboard, chipboard, fiberboard and plywood is well known. In a typical process the organic polyisocyanate, optionally in the form of a solution, dispersion or aqueous emulsion, is applied to the lignocellulosic material which is then subjected to heat and pressure.

It has now been surprisingly found that specific Titanium compositions enhance the cure rate of binders such as starch, isocyanates when used for binding lignocellulosic materials especially oriented strand board Furthermore it has been surprisingly found that certain polyisocyanate compositions containing certain compounds of Group IVB metals and acetoacetate esters are very stable on prolonged storage and provide significant acceleration to the binding of lignocellulosic material used in the core layers of waferboard (known extensively as oriented strand board), medium density fiberboard and particleboard while maintaining excellent physical properties.

According to the invention, a polyisocyanate composition comprising a titanium composition in which the molar ratio of Ti to acetoacetate ester is in the range 1:2.0 to 1:8 and said acetoacetate ester is an ester of an alcohol containing 1 to 4 carbon atoms.

The titanium composition used in the polyisocyanate composition of the invention is described herein as a "complex". It is believed that some of the acetoacetate ester will be chemically bound to the metal (Ti) but some can be described as "free" ester. The exact proportions which are bound and free will depend partly upon the exact molar ratios present in the complex but it has been shown that the "free" ester does influence the properties, particularly the stability on storage, of the polyisocyanate composition as a binder for lignocellulosic materials. The use of the word "complex" does not imply that said complex is necessarily separately prepared before addition to a polyisocyanate to form the compositions of the invention. The complex can be formed by preparing the inventive composition using several alternative methods as described hereinafter.

The molar ratio of titanium to acetoacetate ester in the complex is in the range 1:2.0 to 1:8. Preferably, in the range of 1:2.0 to 1:6 and more preferably in the range 1:2.5 to 1:5. In agreement with conventional theories about the co-ordination chemistry of titanium, it is believed that two molecules of acetoacetate ester will be chemically bound to a titanium atom and the remainder will be "free".

The preferred acetoacetate ester for preparing the complex is ethyl acetoacetate. The complex can be prepared from more than one acetoacetate ester but preferably only one acetoacetate ester is present in the complex.

Typically, the complex of titanium is prepared from a titanium alkoxide having the general formula $M(OR)_4$ in which M is Ti and R is a substituted or unsubstituted, cyclic or linear, alkyl, alkenyl group. Preferably, R contains up to 6 carbon atoms and, more preferably, up to 4 carbon atoms. Generally, all four OR groups will be identical but alkoxides derived from a mixture of alcohols can be used and mixtures of alkoxides can be employed when more than one metal is present in the complex. Suitable alkoxides include tetramethoxytitaniun, tetra-ethoxytitanium, tetra-isopropoxytitanium, tetra-n-propoxytitanium, tetrabutoxytitanium, tetrakis(2-ethylhexoxy)titanium, tetrakis(2-etoxyethoxy)-titanium.

Alternatively, the complex can be prepared from condensed alkoxides of titanium. These compounds can be represented by the general formula $RO[M(OR)_2O]_xR$, wherein M and R have the same meaning as discussed above and x is an integer. Generally, these condensed alkoxides consist of a mixture containing compounds of the above formula with x having a range of values. Preferably, x has an average value in the range 2 to 16 and, more preferably, in the range 2 to 8. A condensed alkoxide is usually prepared by the controlled addition of water to an alkoxide, followed by removal of alcohol which is displaced. Suitable condensed alkoxides include the compounds known as polybutyl titanate and polyisopropyl titanate. Complexes of condensed alkoxides can also be prepared by forming a complex of an acetoacetate ester with an alkoxide, adding water to the complex and removing any by-product alcohol.

Other titanium compounds, such as titanium tetrachloride or alkoxides which have been substituted with, for example, glycol or phosphorus substiuents can be used as raw materials for the formation of the complex used in the invention.

The complex can be readily prepared by mixing, for example, an alkoxide or condensed alkoxide with an appropriate amount of acetoacetate ester. Alcohol from the alkoxide will be displaced by the acetoacetate ester and, preferably, the displaced alcohol is removed by, for example, distillation. In a preferred method, 2 moles of acetoacetate ester per atom of Ti are added to an alkoxide or condensed alkoxide and the displaced alcohol is removed by distillation. Any additional acetoacetate ester required is then added to the stripped product. This method is advantageous because it provides a consistent product of known stoichiometry. It is possible to add all the acetoacetate ester in one charge and subsequently remove all the displaced alcohol but some of the "free" acetoacetate ester is usually accidentally removed during this process, leading to inconsistent products and contamination of the displaced alcohol.

Alternatively, a product containing, for example, 2 moles of acetoacetate ester per Ti can be prepared according to the method outlined above and this can be mixed with a polyisocyanate. Any additional acetoacetate ester required to produce the polyisocyanate composition of the invention can be added to the polyisocyanate before or after the titanium-compound has been added. Other methods of preparing the composition of the invention will be apparent to a person skilled in this art.

The amount of titanium complex present in the polyisocyanate composition of the invention is usually in the range 0.01 to 5% by weight, based on the polyisocyanate and, preferably, the amount is in the range 0.03 to 1%. More preferably, the amount of complex present is in the range 0.05 to 0.5% by weight with respect to polyisocyanate.

Polyisocyanates for use in the composition of the present invention may be any organic polyisocyanate compound or mixture of organic polyisocyanate compounds, provided said compounds have at least 2 isocyanate groups. Organic polyisocyanates include diisocyanates, particularly aromatic diisocyanates, and isocyanates of higher functionality.

Examples of organic polyisocyanates which may be used in the composition of the present invention include aliphatic isocyanates such as hexamethylene diisocyanate; and aromatic isocyanates such as m- and p-phenylene diisocyanate, tolylene-2,4- and tolylene-2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether.

Modified polyisocyanates containing isocyanurate, carbodiimide or uretonimine groups may be employed as well. Further blocked polyisocyanates, like the reaction product of a phenol or an oxime and a polyisocyanate, may be used, having a deblocking temperature below the temperature applied when using the polyisocyanate composition.

The organic polyisocyanate may also be an isocyanate-ended prepolymer made by reacting an excess of a diisocyanate or higher functionality polyisocyanate with a polyol.

Water-emulsifiable organic polyisocyanates like those described in UK patent no. 1 444 933, in European patent publication no. 516 361 and in PCT patent publication no. 91/03082 can also be used.

Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates.

Such mixtures are well-known in the art and include the crude phosgenation products containing methylene bridged polyphenyl polyisocyanates, including diisocyanate, triisocyanate and higher polyisocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or a mixture of methylene bridged polyphenyl polyisocyanates containing diisocyanates, triisocyanates and higher functionality polyisocyanates.

Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as polymeric MDI. Suitable polyisocyanates include SUPRASEC™ DNR, SUPRASEC™ 2185, RUBINATE™ M and RUBRNATE™ 1840, all available from Imperial Chemical Industries.

Preferably the polyisocyanate is liquid at room temperature,

In order to further improve the storage stability of the polyisocyanate composition of the present invention a diluent may be added to the composition. Suitable diluents include plasticizers of the type mentioned in "Taschenbuch der Kunststoff-Additive", Ed. by R. Gachter and H. Muller, Carl Hanser Verlag Munchen, third edition, 1989. Preferred diluents are phthalates, aliphatic carboxylates, fatty acid esters, linseed oil and soybean oil. These diluents are added in amounts of from 1 to 40 parts by weight per 100 parts by weight of polyisocyanate and preferably in amounts of from 1 to 15 parts by weight per 100 parts by weight of polyisocyanate.

The composition further may also comprise conventional additives like flame retardants, lignocellulosic preserving agents, fungicides, waxes, sizing agents, fillers, surfactants, thixotropic agents and other binders like formaldehyde condensate adhesive resins and lignin (optionally in combination with a lignin solvent such as described in PCT patent application Ser. No. EP96/00924).

The polyisocyanate composition of the present invention can be made by simply mixing the ingredients at room temperature.

The present invention is also concerned with a process for preparing lignocellulosic bodies by bringing lignocellulosic parts into contact with the present polyisocyanate composition and by pressing this combination.

Therefore the present invention also provides a process for binding lignocellulosic material comprising the steps of a) bringing said lignocellulosic material in contact with the present polyisocyanate composition and b) subsequently allowing said material to bind.

The lignocellulosic bodies are prepared by bringing the lignocellulosic parts into contact with the polyisocyanate composition by means such as mixing, spraying and/or spreading the composition with/onto the lignocellulosic parts and by pressing the combination of the polyisocyanate composition and the lignocellulosic parts, preferably by hot-pressing, normally at 140° C. to 270° C. and 2 to 6 MPa specific pressure.

Such binding processes are commonly known in the art.

In waferboard manufacture the lignocellulosic material and the polyisocyanate composition may be conveniently mixed by spraying the present polyisocyanate composition on the lignocellulosic material while it is being agitated.

The lignocellulosic material after treatment with the polyisocyanate composition is placed on caul plates made of aluminium or steel which serve to carry the furnish into the press where it is compressed to the desired extent usually at a temperature between 140° C. and 270° C.

While the process is particularly suitable for the manufacture of waferboard known extensively as oriented strand board and will be largely used for such manufacture, the process may not be regarded as limited in this respect and can also be used in the manufacture of medium density fiberboard, particle board (also known as chipboard) and plywood.

Thus the lignocellulosic material used can include wood strands, woodchips, wood fibres, shavings, veneers, wood wool, cork, bark, sawdust and like waste products of the wood working industry as well as other materials having a lignocellulosic basis such as paper, bagasse, straw, flax, sisal, hemp, rushes, reeds, rice hulls, husks, grass, nutshells and the like. Additionally, there may be mixed with the lignocellulosic materials other particulate or fibrous materials such as ground foam waste (for example, ground polyurethane foam waste), mineral fillers, glass fibre, mica, rubber, textile waste such as to plastic fibres and fabrics.

When the polyisocyanate composition is applied to the lignocellulosic material, the weight ratio of polyisocyanate/lignocellulosic material will vary depending on the bulk density of the lignocellulosic material employed. Therefore, the polyisocyanate compositions may be applied in such amounts to give a weight ratio of polyisocyanate/ lignocellulosic material in the range of 0.1:99.9 to 20:80 and preferably in the range of 0.5:99.5 to 10:90.

The polyisocyanate compositions of the present invention allows operating temperatures far below the standard operating temperatures. Hence major energy savings can be made.

If desired, other conventional binding agents, such as formaldehyde condensate adhesive resins, may be used in conjunction with the polyisocyanate composition.

More detailed descriptions of methods of manufacturing waferboard and similar products based on lignocellulosic material are available in the prior art. The techniques and equipment conventionally used can be adapted for use with the polyisocyanate compositions of the present invention.

The sheets and moulded bodies produced from the polyisocyanate compositions of the present invention have excellent mechanical properties and they may be used in any of the situations where such articles are customarily used.

The invention is illustrated but not limited by the following examples.

EXAMPLE 1

A reactor was charged with tetraisopropyl titanate (1400 kg, Tilcom® TIPT from ICI Vertec). Ethylacetoacetate (1282 kg) was then added with stirring. The resulting product was a pale red liquid. The displaced alcohol (580 kg, isopropanol) was then removed by evaporation to leave a red liquid PRODUCT A (2090 kg). This was then diluted by addition of ethylacetoacetate in the following molar ratio (1 mole PRODUCT A to 2.5M ethylacetoacetate) to yield PRODUCT B.

A polyisocyanate composition was then prepared comprising 0.18 parts weight of PRODUCT B described above and 100 parts by weight of standard polyisocyanate (SUPRASEC DNR, available from Imperial Chemical Industries) to yield a material PRODUCT C.

Stability Testing of PRODUCT C vs Standard Isocyanate (Comparative)

The stability of PRODUCT C was evaluated by storing PRODUCT C 45° C. and then testing the viscosity of each system at 25° C. using a Broolfield viscometer at various time. The following data was obtained:
Results are reported below in Pa s.

| Days | PRODUCT C | Comparative |
|---|---|---|
| 21 | 280 | 244 |

To evaluate the utility of PRODUCT C in accelerating the curing of the core layers of an OSB panel against a standard polyisocyanate composition used industrially within the core of an OSB panel PRODUCT C was used to bind the softwood strands used in the core layers in the following manner:

Panels Containing Product C

3 Layer boards were prepared of 15×400×400 mm at a density 650 kg/m$^3$. MUPF resin was used to bind the face layers (11% resin loading based on dry wood). PRODUCT C was used to bind the core layer (4% resin loading based on dry wood). Both layers also contained a sizing wax emulsion (SPG 60 available from Condea Chemie) at 1% loading (solid wax) based on dry wood. The pre-pressing moisture content was 11% in the face layers and 6% in the core layer.

Standard Isocyanate (Comparative)

3 Layer boards were prepared of 15×400×400 mm at a density 650 kg/m$^3$. MUPF resin was used to bind the face layers (11% resin loading based on dry wood) and standard polyisocyanate (SUPRASEC DNR, available from Imperial Chemical Industries) used to bind the core layer (4% resin loading based on dry wood). Both layers also contained a sizing wax emulsion (SPG 60 available from Condea Chemie) at 1% loading (solid wax) based on dry wood. The pre-pressing moisture content was again 11% in the face layers and 6% in the core layer.

To determine the minimum cycle time a press temperature of 190° C. was used. The minimum possible cycle time was obtained by reducing the overall cycle time until a failure in panel performance was evident (either through a loss of control over panel thickness or through adhesive failure). The following results were obtained for panels prepared as described earlier:

|  | Standard Polyisocyanate | PRODUCT C |
|---|---|---|
| Minimum cook time (seconds of pressing per mm of panel thickness) | 7.0 | 6.3 |

The composite produced under conditions described above were then tested using a range of industry standard tests to measure physical properties (Modulus of elasticity and rupture according to EN310/V100 internal bond according to EN1087/Swelling after 24 hrs of soaking in water according to EN317). The measured properties showed no significant performance difference between composites prepared with SUPRASEC DNR and PRODUCT C and demonstrates the advantages of using polyisocyanate compositions of the invention to achieve accelerated binding of lignocellulosics relative to standard polyisocyanate compositions whilst not affecting physical performance of the resulting composite panels.

EXAMPLE 2

A polyisocyanate composition was prepared comprising 0.18 parts by weight of PRODUCT B (described above) and 100 parts by weight of standard polyisocyanate (SUPRASEC DNR, available from Imperial Chemical Industries) to yield a material PRODUCT D.

To evaluate the utility of PRODUCT D in accelerating the curing of a OSB panel against a standard polyisocyanate composition used industrially within the core of an OSB panel PRODUCT D was then used to bind softwood strands in the following manner:

Panels Containing Product D

3 Layer boards were prepared of 25×250×250 mm at a density 650 kg/m$^3$. Standard polyisocyanate resin (SUPRASEC DNR, available from Imperial Chemical Industries) was used to bind the face layers (4% resin loading based on dry wood). PRODUCT D was used to bind the core layer (4% resin loading based on dry wood). Both layers also contained a sizing wax emulsion (SPG 60 available from Condea Chemie) at 1% loading (solid wax)

based on dry wood. The prepressing moisture content was 11% in the face layers and 6% in the core layer.

Standard Isocyanate

3 Layer boards were prepared of 25×250×250 mm at a density 650 kg/m³. Standard polyisocyanate (SUPRASEC DNR, available from Imperial Chemical Industries) resin was used to bind the face layers (4% resin loading based on dry wood) and standard polyisocyanate (SUPRASEC DNR, available from Imperial Chemical Industries) used to bind the core layer (4% resin loading based on dry wood). Both layers also contained a sizing wax emulsion (SPG 60 available from Condea Chemie) at 1% loading (solid wax) based on dry wood. The prepressing moisture content was again 11% in the face layers and 6% in the core layer.

To determine the minimum cycle time a press temperature of 190° C. was used The minimum possible cycle time was obtained by reducing the overall cycle time until a failure in panel performance was evident (either through a loss of control over panel thickness or through adhesive failure). The following results were obtained for panels prepared as described earlier:

|  | Standard Polyisocyanate | PRODUCT D |
|---|---|---|
| Minimum cook time (seconds of pressing per mm of panel thickness) | 13.0 | 11.0 |

The above clearly demonstrates the advantages of using polyisocyanate compositions of the invention to achieve accelerated binding of lignocellulosics relative to standard polyisocyanate compositions whilst not affecting physical performance of the resulting composite panels.

What is claimed is:

1. A polyisocyanate composition comprising a titanium complex comprising titanium and an acetoacetate ester in which the molar ratio of Ti to acetoacetate ester is in the range 1:2 to 1:8 and said acetoacetate ester is an ester of an alcohol containing 1 to 4 carbon atoms.

2. A polyisocyanate composition according to claim 1 in which the complex is a complex of titanium having a molar ratio of Ti to acetoacetate ester in the range 1:2 to 1:6.

3. A polyisocyanate composition according to claim 2 in which the molar ratio of Ti to acetoacetate ester is in the range 1:2.5 to 1:5.

4. A polyisocyanate composition according to claim 1 in which the acetoacetate ester is ethyl acetoacetate.

5. A polyisocyanate composition according to claim 1 in which the complex has been prepared from titanium alkoxide having the general formula $M(OR)_4$ in which M is Ti and R is substituted or unsubstituted cyclic or linear, alkyl, alkenyl group.

6. A polyisocyanate composition according to claim 5 in which R contains up to 6 carbon atoms.

7. A polyisocyanate composition according to claim 6 in which R contains up to 4 carbon atoms.

8. A polyisocyanate composition according to claim 1 in which the complex has been prepared from condensed titanium alkoxide having the general formula $RO[M(OR)_2O]_xR$ in which M is Ti and x is an interger and R is substituted or unsubstituted, cyclic or linear, alkyl, alkenyl group.

9. A polyisocyanate composition according to claim 8 in which the average value of x is in the range 2 to 16.

10. A polyisocyanate composition according to claim 1 in which the complex is prepared from an alkoxide and displaced alcohol is removed.

11. A polyisocyanate composition according to claim 1 in which the complex is present in an amount in the range 0.03 to 1% by weight based on the polyisocyanate.

12. A polyisocyanate composition according to claim 11 in which the amount of complex is in the range 0.05 to 0.5% by weight based on the polyisocyanate.

13. A polyisocyanate composition according to claim 1 in which the polyisocyanate is diphenylmethane polyisocyanate or a mixture of methylene bridged polyphenyl polyisocyanate.

14. A polyisocyanate composition according to claim 1 additionally comprising a diluent.

15. A polyisocyanate composition according to claim 14 in which the diluent is a phthalate, an aliphatic carboxylate, a fatty acid ester, linseed oil or soybean oil.

16. A polyisocyanate composition according to claim 15 in which the diluent is present in an amount in the range 1 to 40 parts by weight per 100 parts by weight of polyisocyanate.

17. A polyisocyanate composition according to claim 1 additionally comprising a formaldehyde condensate adhesive resin.

18. A polyisocyanate composition according to claim 17 in which the formaldehyde condensate adhesive resin is present in an amount in the range 1 to 40 parts by weight per 100 parts by weight of polyisocyanate.

19. A polyisocyanate composition according to claim 18 in which the formaldehyde condensate adhesive resin is present in an amount in the range 1 to 20 parts by weight per 100 parts by weight of polyisocyanate.

20. A process for binding lignocellulosic material comprising the steps of a) bringing lignocellulosic material into contact with a polyisocyanate composition according to any one of the preceding claims and b) subsequently allowing said material to bind.

21. A process according to claim 20 in which the polyisocyanate composition is brought into contact with the lignocellulosic material and the combination thereby formed is hot-pressed between metal plates at a temperature in the range 140° C. to 270° C. and a specific pressure in the range 2 to 6 MPa.

22. A process according to claim 20 in which the polyisocyanate composition is applied in such an amount as to give a weight ratio of polyisocyanate to lignocellulosic material in the range 0.1:99.9 to 20:80.

23. A method comprising using a Titanium complex as defined in claim 1 for accelerating the binding of lignocellulosic materials.

24. A process for accelerating the binding of lignocellulosic material comprising:

a) contacting lignocellulosic material with a complex comprising titanium and an acetoacetate ester in which the molar ratio of Ti to acetoacetate ester is in the range 1:2 to 1:8 and said acetoacetate ester is an ester of an alcohol containing 1 to 4 carbon atoms and b) subsequently allowing said material to bind.

* * * * *